June 3, 1941.	F. R. CAPPS	2,244,049
VENEER CUTTING MACHINE
Filed June 30, 1939	4 Sheets—Sheet 1

Inventor
Frank R. Capps
By A. Yates Dowell
Attorney

June 3, 1941. F. R. CAPPS 2,244,049
VENEER CUTTING MACHINE
Filed June 30, 1939 4 Sheets-Sheet 2
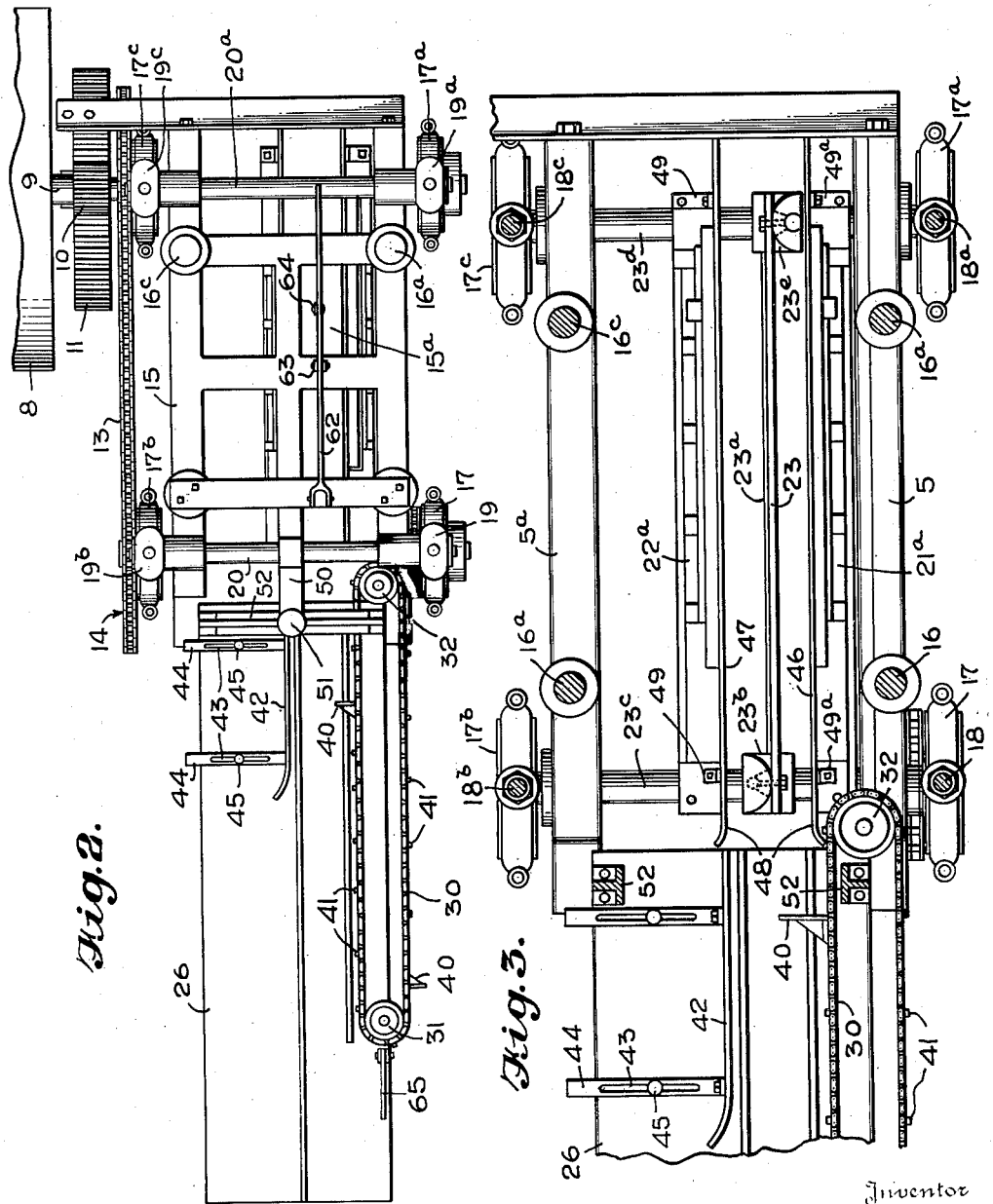

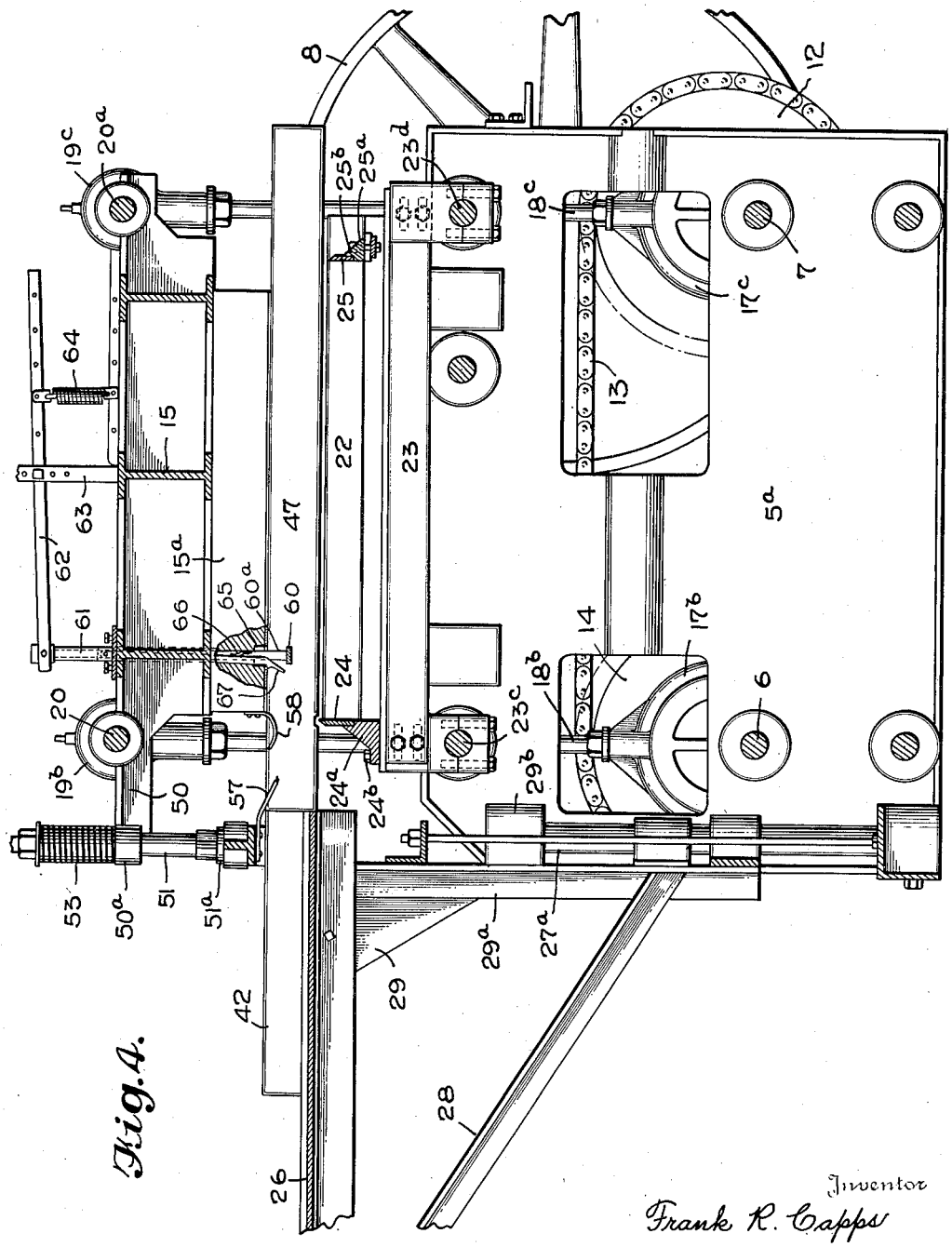

June 3, 1941.  F. R. CAPPS  2,244,049
VENEER CUTTING MACHINE
Filed June 30, 1939  4 Sheets-Sheet 4

Inventor
Frank R. Capps
A. Yates Dowell
Attorney

Patented June 3, 1941

2,244,049

UNITED STATES PATENT OFFICE 2,244,049

VENEER CUTTING MACHINE

Frank R. Capps, Jacksonville, Fla.

Application June 30, 1939, Serial No. 282,286

18 Claims. (Cl. 164—48)

This invention relates to machines for cutting veneer and analogous material. Primarily, the machine forming the subject matter of the invention was devised for volume production of relatively thin strips for use in the manufacture of baskets, boxes and other containers used for packing and shipping fruits, vegetables and the like.

In cutting such strips from veneer, it is desirable that the cut be clean and free from ragged edges; that provision be made to cut the strips to the desired shape, width and length without waste; and that the machine be flexible as to operation and able to produce in volume continuously without jamming or breakdown; and the present invention contemplates a machine capable of efficiently carrying out the foregoing results.

The machine in its preferred construction embodies a feed table on which the sheets of veneer stock are disposed, the stock being automatically fed forwardly into the machine and subjected to the action of cutting knives of a particular advantageous type adjustable to cut the sheets to the desired shape, width and length. During the cutting operation, the table is depressed automatically in order that the stock on the table may follow that portion of the stock being severed to thereby ensure a smooth, clean cut. When the table is depressed, the means for feeding the stock is automatically rendered idle or disconnected from its drive, and when the table moves back to feeding position, the drive is reengaged to feed the stock forwardly into the machine.

The various objects, advantages and improved features of construction of the machine will become apparent in view of the following description taken in conjunction with the drawings, wherein:

Fig. 2 is a top plan view thereof;

Fig. 3 is a horizontal section taken substantially on the line 3—3, Fig. 1;

Fig. 4 is a section taken substantially on the line 4—4, Fig. 2;

Figures 1, 7:
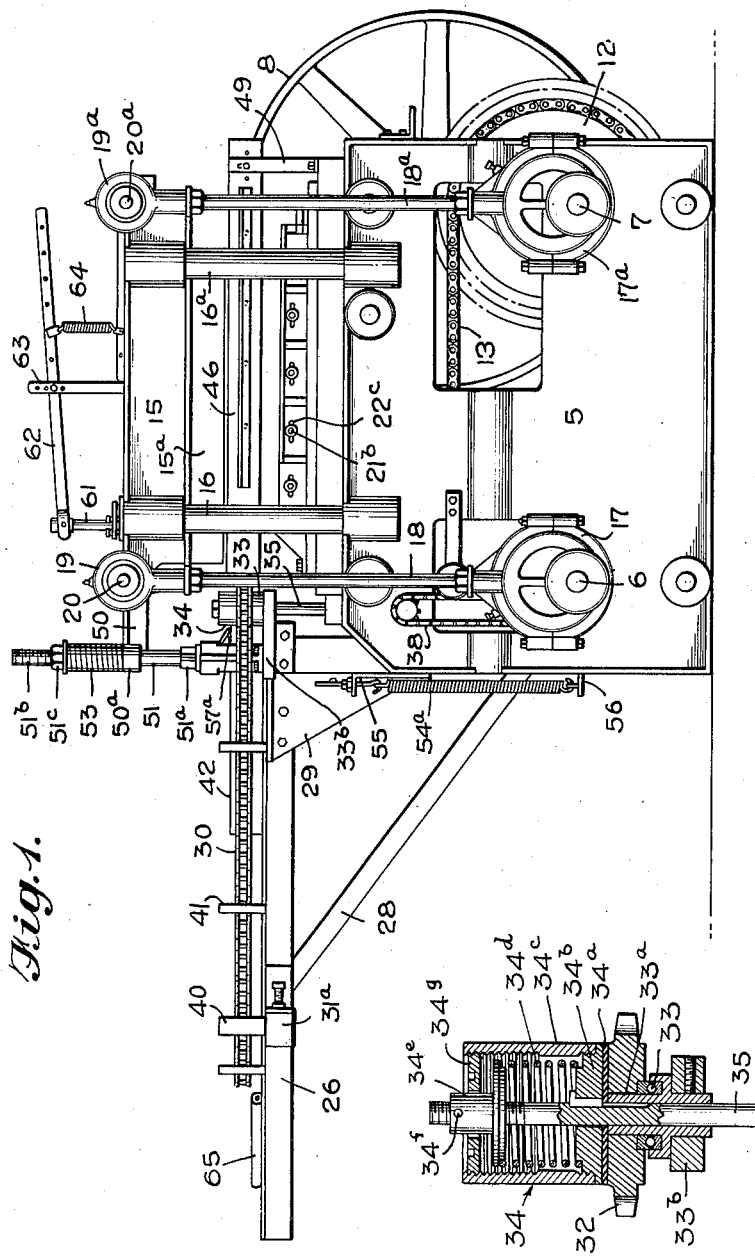
Fig. 1 is a view in side elevation of a veneer cutting machine constructed in accordance with the features of the present invention.
Fig. 7 is a detail sectional view of clutch mechanism.

Referring to the drawings in detail, the machine comprises a main bed frame made up of upright side members in the form of castings 5 and 5a rigidly cross connected and braced and having journaled therein shafts 6 and 7. The machine is driven by means of a main drive pulley 8 which is mounted on shaft 9, the latter having an operative connection with shaft 7 through the medium of drive pinion 10 in mesh with gear 11. Shaft 7 also has mounted thereon a sprocket 12; and the drive is transmitted from shaft 7 to shaft 6 through the medium of sprocket chain 13 which is passed over a sprocket gear 14 mounted on the one end of the latter shaft.

A vertically reciprocating veneer stack or bundle depressing press head frame 15 is provided and is slidably mounted on guide posts 16, 16a, 16b and 16c. This frame carries a press head in the form of a block 15a and is reciprocated through the medium of eccentrics 17, 17a, 17b and 17c operatively connected to the opposite ends of the shafts 6 and 7. The eccentrics have connected thereto pitman rods 18, 18a, 18b, 18c which at their upper ends are provided with bearings 19, 19a, 19b, 19c mounted on cross shafts 20 and 20a which shafts support the frame 15.

It will thus be seen that as the shafts 6 and 7 are rotated, the eccentrics 17—17c reciprocate the press head frame 15 and press head 15a with each rotation of said shafts.

Figure 6:
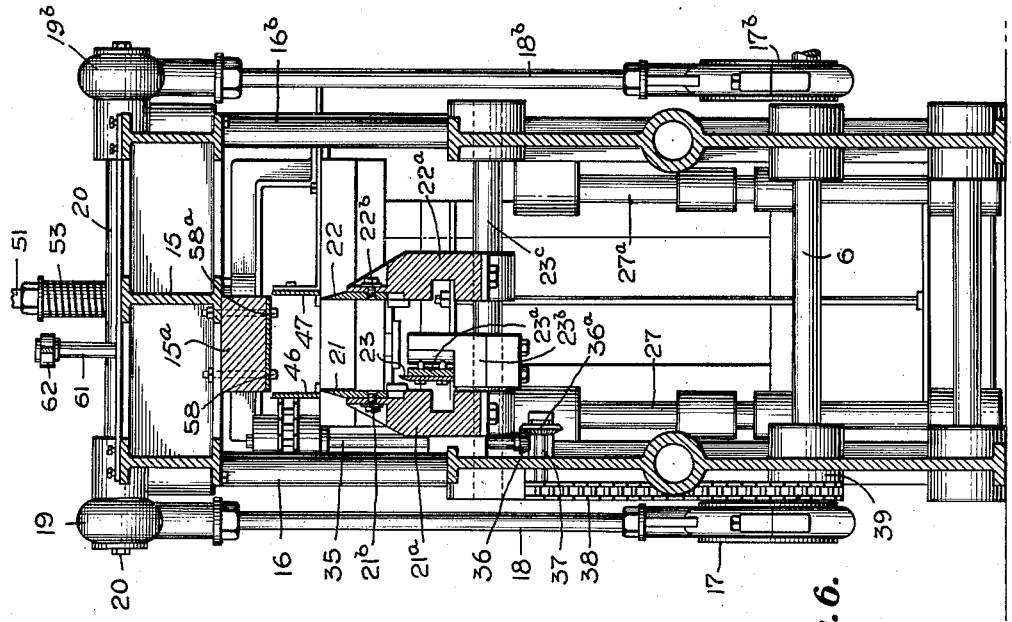
Fig. 6 is a transverse vertical section taken substantially on the line 6—6, Fig. 1.

The cutting knives, of which there are five, three acting longitudinally of the bundle and two transversely or laterally of the bundle, are mounted in a bed frame and the bundle of veneer is pressed downwardly into engagement therewith. Of the three longitudinal knives, two are what may be termed side trimming knives and the other an intermediate splitting knife. The arrangement of the knives is best seen in Figs. 3, 4 and 6, the longitudinally extending side trimming knives being indicated at 21 and 22, the intermediate splitting knife at 23. The knives 21 and 22 define the side edges of the cut strips and the knife 23 severs the strips at an intermediate point. The knife 21 is adjustably mounted on a supporting frame 21a by means of bolts 21b passed through slotted openings; while the knife 22 is mounted on a similar frame 22a and is adjustable through the medium of bolts 22b which also project through slotted openings as at 22c, note Fig. 1. The knife 23 is mounted on a supporting bracket 23a for longitudinal adjustment in a manner similar to the knives 22 and 23, said latter bracket being supported by end blocks 23b.

The supporting frames 21a, 22a for the knives 21 and 22 as well as the blocks 23b which support the knife 23 are adjustably secured on cross shafts 23c and 23d so that they may be spaced laterally at will to in turn vary the overall width of the side trim or cut or may be adjusted relatively to one another; while the knife 23 may be adjusted both laterally and angularly with respect to the knives 21 and 22, note Fig. 3 wherein the blocks 23b which support the bracket 23a for knife 23 are formed with rounded or arcuate portions 23e to accommodate such adjustment.

A cross knife 24 is mounted at substantially right angles to the knives 21, 22 and 23, note particularly Fig. 4, and is carried by a holder or bracket 24a. This knife defines the limit of one end of each strip of veneer cut. Coacting with the knife 24 is a knife 25 which is carried by a holder or bracket 25a, the knife 25 serving to trim the opposite or furthermost advanced end of the strip or strips of veneer. Both the knives 24 and 25 are mounted for adjustment both laterally and longitudinally, the holders 24a and 25a therefor being secured to their supports by means of bolts 24b and 25b which project through slots disposed at right angles to one another to provide for such adjustment.

While it is preferred to use the knife 25 to trim the advanced end of the veneer or stacks, yet it will be understood that this knife could be substituted by a stop which would simply limit the travel of the stack, the advanced end of the stack having been previously operated on by the knife 24.

Figure 5:
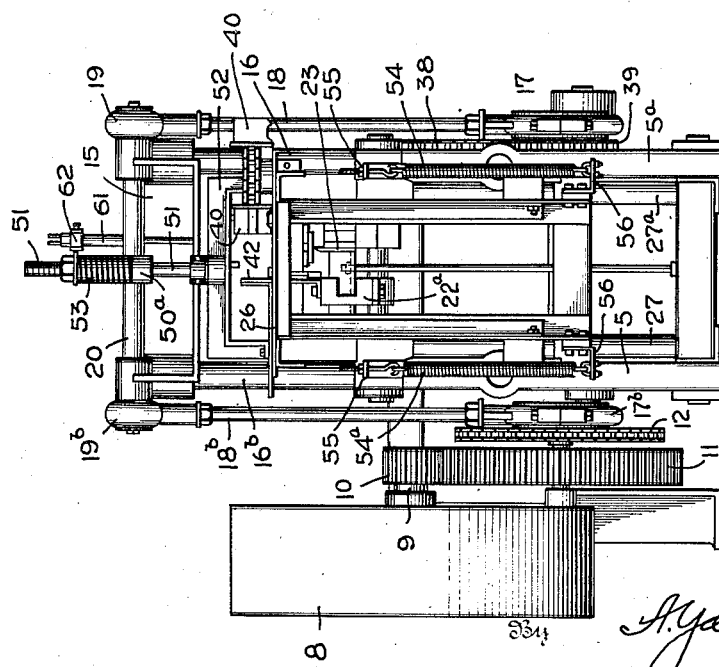
Fig. 5 is a view in end elevation looking towards the feeding end of the machine.

The veneer stock or layers of wood or other material from which the strips are cut, is disposed in bundles on a table 26 which is slidingly supported primarily on uprights or posts 27 and 27a, the table being connected to these posts and braced through the medium of angle brackets or struts 28 and gusset plates 29 which are connected to vertical angle members 29a, the latter in turn being connected to bearings 29b which are slidingly mounted on the posts 27, 27a, note particularly Figs. 4 and 5.

Stack feed mechanism is provided in conjunction with the table 26 and includes a sprocket chain 30 which is mounted on said table, said chain at the outer end of the table being passed over an idler gear 31 mounted in an adjustable support 31a, note Fig. 2 in connection with Fig. 1, and adjacent the inner or discharge end of the table being passed around a drive sprocket gear 32 which is operatively associated with clutch mechanism generally indicated at 34 and shown in detail in Fig. 7.

The sprocket gear 32 together with its bearing 33 is carried by sliding sleeve 33a, the sleeve and bearing being supported by means of a forked bracket 33b which is secured to and reciprocates with the table 26. The sleeve 33a together with the sprocket 32 and bearing 33 is slidably mounted on a vertical extending shaft 35.

The clutch proper comprises a friction disc 34a which is secured on a backing plate 34b having a portion thereof externally threaded to receive a housing member 34c in which a clutch spring 34d is mounted. The backing plate 34b is secured against rotation on the shaft 35 by means of a key, but is free to move axially along the shaft. A retaining nut 34e is threaded on the upper end of shaft 35 and is provided with a series of spanner wrench holes 34f to provide for ready adjustment of the pressure of friction disc 34a with respect to the upper surface of the sprocket 32 with which it coacts. The nut 34e is vertically movable with respect to the housing 34c. A top cover 34g is adjustably threaded into the upper end of the housing around the nut 34e and constitutes a stop to limit the throw of the clutch. Adjustment of the cover 34g in the housing 34c limits the axial movement along shaft 35 of the friction disc 34a which is mounted on the backing plate 34b, so that when the face of the sprocket 32 is moved away from the face of the friction 34a, the disc can only follow it for a limited distance.

Shaft 35 is driven from shaft 6 through gears 36, 36a, note Fig. 6, the gear 36a being mounted on a stub shaft 37 having connected thereto a sprocket chain 38 which engages over sprocket gear 39 secured on the one extremity of shaft 6.

It will be seen that when the table is depressed in a manner to be described, the sleeve 33a carrying the sprocket 32 will slide downwardly on the shaft 35 and be disengaged from the clutch disc 34a; and when the table returns to its uppermost position, the sleeve 33a will slide back on the shaft 35 and bring the sprocket 32 into clutch-engaging position.

The feed chain 30 has connected thereto pusher plates 40 and 40a which are spaced to engage each stack of veneer and advance it forwardly when the sprocket 30 is driven through the medium of the clutch 34. Guards 41 are also fixed to the feed chain 30 to prevent the lower sheets of the stack from engaging beneath the said sprocket and jamming. In other words, the guards 41 assist in maintaining the sheets of each stack of veneer in alignment.

An adjustable guide 42, note particularly Fig. 3, is mounted on the table 26, adjustment being provided through the medium of elongated slots 43 formed in supporting brackets 44, clamping nuts 45 being passed through these slots to hold the guide 42 in adjusted position. When the stacks pass from the table 26 into the machine proper, they are guided by means of side guides 46 and 47, each having outwardly flared receiving ends as indicated at 48. These guides are carried by brackets 49.

The table is depressed by means of an arm 50 which is projected outwardly from the head frame 15 and has on the outer end thereof a sliding contact head or collar 50a, the latter being mounted on a vertically extending shaft 51 which at its lower end is connected to a yoke 52 secured to the table 26, note particularly Figs. 1 and 5. The shaft 51 has at the lower end thereof a stop or contact member 51a against which the sliding head or collar 50a strikes when the frame 15 reciprocates downwardly. The upper end of the shaft 51 is threaded as at 51b, and a compression spring 53 is mounted over the upper extremity of said shaft and is adjustable through the medium of nut 51b.

Springs 54 and 54a normally urge the table to elevated position, each of said springs at its upper end being adjustably connected to the stationary frame of the machine as at 55 and at its lower end being connected to a bracket 56, in turn secured to the supporting framework for the table.

It will be seen that when the frame 15 and the press head or block 15a move downwardly, the head 50a on the end of the arm 50 slides downwardly on shaft 51 until it contacts the member 51a, whereupon the table 26 is depressed against the resistance of springs 54, 54a; and when the frame 15 moves upwardly, the springs 54 and 54a return the table to its elevated position. The spring 53 operates to insure an equalized pressure or upward pull on the table when the latter reaches its elevated position, to thereby insure a proper clutching action. Thus, when the springs 54 and 54a have brought the table substantially to its elevated position, the spring 53 is then compressed and takes up the pull at this point and maintains clutching pressure constant at each reciprocation of the table.

Since the stacks of veneer are comprised of irregularly bent sheets, resulting in a more or less loose or unevenly compacted bundle or stack, it is desirable that the stack be guided from above. With this in view, fingers 57 and 57a are connected to the yoke 52 and project outwardly so that the stack of veneer will pass therebeneath and be guided into the machine at this point. Also, additional guide or pressure fingers 58 and 58a are secured on the block 15a and function in a manner similar to the fingers 57, 57a.

In operation, a stack of veneer stock is disposed on the table 26 in a position such as will cause it to be engaged by one of the pusher plates 40 or 40a, the stack being advanced into the machine between the side guides 42, 46 and 47, guiding pressure being exerted on top of the stack by fingers 57, 57a and 58, 58a. The machine is timed so that when each stack advances to a point such as will give the proper length to the strips being cut, the frame 15 carrying the block 15a descends and presses the bundle down on and between the knives 21, 22 and 24, 25 and then into engagement with the knife 23. The side and end knives are adjustable to obtain the desired overall width and length of the strips being cut, while the knife 23 may be adjusted to provide either a straight split or cut or else may be adjusted in conjunction with the knives 21 and 22 to provide a tapered or otherwise angularly shaped strip.

When the frame 15 carrying the press head 15a descends, the contact collar or head 50a at first slides freely on the vertical shaft 51 until it strikes the contact member 51a, whereupon the table moves downwardly with the press head, freeing the drive sprocket 32 from the clutch disc 34a and the drive on the stacks ceases.

After the cut is completed, the severed pieces drop down on to a conveyor, not shown, which takes them to a suitable point of deposit or discharge. The overhead frame 15 carrying the block 15a then moves upwardly, and the springs 54 and 54a in conjunction with the compression spring 53 pull the table back to its uppermost position, the clutch 34 is re-engaged and the drive on the sprocket 30 resumed, and the cycle is repeated.

It sometimes happens that the veneer is warped to an extent such that after the head 15a has pressed the veneer down into the knives and has risen to the point where the succeeding stack of veneer begins to feed over the knives, the sheets already cut spring up about the knives and block the succeeding stack being fed over the knives. It is therefore necessary to hold these cut sheets down until the stack that is being fed to and over the knives rides over these sheets. To provide for this contingency, a transverse pressure finger 60 is connected to a latch rod 60a slidably mounted in a vertical bore formed in the press head block 15a and the frame 15. The latch rod 60a is pivoted to link rod 61 in turn pivotally connected to a lever 62 fulcrumed on a post 63. A spring 64 is connected to the lever 62 beyond the fulcrum point thereof and normally urges the latch rod 61 upwardly, in which position the transverse finger 60 comes to rest in a recess 65 formed in the press head block 15a. A spring 66 normally urges the latch rod towards latching position, and a trigger 67 is provided at the forward end of the latch rod and is adapted to engage the advancing sheets and trip the latch rod.

Assuming that the parts have been set in the position shown in Fig. 4, when the press head lowers and presses the veneer down into the knives, the latch rod 60a and finger 60 remain in this lowered position with the said finger holding the sheets down in the knives. As the succeeding stack feeds over the sheets already in the knives, it strikes the trigger 67 on latch rod 60a and the latter is jerked up out of the way of the succeeding stack, permitting the latter to advance onwardly into cutting position. To reset the finger 60, the free end of lever 62 is pushed upwardly against resistance of spring 64.

It will be obvious to those skilled in the art that various changes may be made in this device without departing from the spirit of the invention and therefore the invention is not limited to what is shown in the drawings and described in the specification but only as indicated in the appended claims.

What is claimed is:

1. In a machine for cutting strips from veneer, a plurality of knives arranged to cut strips of predetermined shape, means for feeding stacks of veneer to said knives, means for depressing each stack into engagement with said knives, means for retracting said depressing means, means for automatically stopping the feed of the stack during the cutting operation, and means for automatically starting the feed of the stack upon retraction of said depressing means.

2. In a machine for cutting strips from veneer, a plurality of knives arranged to cut strips of predetermined size and shape, a feed table on which veneer is disposed in stacks, a feed device on said table for advancing the stacks to said knives, means for actuating said device, means for depressing each stack of veneer into engagement with the knives, means coacting with said depressing means for automatically moving the table downwardly with the stack, means for disengaging said actuating means when the table moves downwardly and reengaging said actuating means when the table returns to normal position.

3. In a machine for cutting strips from veneer, a plurality of knives arranged to cut strips of predetermined size and shape, a feed table on which the veneer is disposed in stacks, a feed device on said table for feeding the stacks to said knives, means for driving said device, means for depressing the stacks into engagement with the knives as they are advanced into the machine, means coacting with said depressing means automatically moving the table downwardly with the stack, means returning the table to normal position after the cutting operation, and a clutch member arranged to disengage said driving means when the table is moved downwardly during the cutting operation and reengaging said driving means when the table returns to normal position.

4. In a machine for cutting strips from veneer, a bed frame, a plurality of knives supported by said frame and arranged to cut strips of predetermined size and shape, means for depressing the veneer into engagement with said knives to effect the cutting operation, said knives including a pair of knives arranged to cut a strip of a certain overall width and an intermediate knife arranged to split or sever the strip cut by the said pair of knives.

5. In a machine for cutting strips from veneer, a plurality of knives arranged to cut strips of predetermined size and shape, means for bringing the veneer and knives into coacting cutting relation to sever the veneer into strips, said knives including a pair of knives adapted to operate on a spaced portion of the stack and an intermediate knife operating to split the strips severed by said pair of knives, and means for adjusting the said knives with respect to one another to vary the size and/or shape of the strips.

6. In a machine for cutting strips from veneer, a bed frame, a plurality of knives supported by said bed frame and arranged to cut strips of predetermined size and shape, there being at least four knives, two of which are spaced laterally to cut a strip of predetermined width, a knife intermediate of said spaced knives adapted to split the strips so severed at an intermediate point, and another knife positioned at substantially right angles to said spaced and intermediate knives operating to define the end of each strip.

7. In a machine for cutting strips from veneer, a bed frame, a plurality of knives supported by said bed frame and arranged to cut the strips of predetermined size and shape, there being at least three knives, two of which are spaced laterally to cut a strip of predetermined width and another knife intermediate of said spaced knives adapted to cut or split the strips so severed at an intermediate point, and means for adjusting the intermediate knife with respect to the spaced knives to vary the angle of cut of the intermediate knife.

8. In a machine for cutting strips from veneer, a plurality of knives arranged to cut strips of predetermined size and shape, there being at least four knives, three of which operate to cut longitudinally of the stack and a fourth knife coacting therewith and arranged at substantially right angles thereto to sever the strips laterally of the stack, means for intermittently advancing the veneer into cutting relation with the knives, and means for definitely limiting the advance of the veneer to gauge the length of the severed strips.

9. In a machine for cutting strips from veneer, a bed frame, a plurality of knives supported by said frame arranged and spaced with respect to one another to cut strips of predetermined width and length, said knives including a pair of spaced knives adapted to operate longitudinally of the stack and an intermediate knife disposed below said pair of knives and arranged to split the strips operated on by said spaced pair of knives, another knife arranged at right angles to said spaced pair and intermediate knives and disposed to sever the strip laterally of the stack, a press head disposed above said knives, means for feeding veneer in stacks successively to a position over said knives, and means for actuating said press head to press the stacks into cutting engagement with said knives.

10. In a machine for cutting strips from veneer, a bed frame, a plurality of knives supported by said frame and arranged to sever strips in predetermined size and shape, a press head disposed above said knives, means for feeding the veneer successively in stacks to a position over said knives, means for guiding the stacks of veneer to thereby align them in proper cutting relation with respect to the knives, and means for actuating the press head to press the stacks into cutting relation with the knives.

11. In a machine for cutting strips from veneer, a bed frame, a plurality of knives supported by said frame and arranged to cut strips of predetermined size and shape, a movable press head disposed above said knives, means for feeding veneer in stacks successively to a position above said knives, guides arranged in spaced relation above said knives between which the stacks are fed and by which the stacks are aligned with respect to the knives, and means for actuating said press head to press the stacks into cutting relation with said knives.

12. In a machine for cutting strips from veneer, a bed frame, a plurality of knives supported by said frame and arranged to cut strips of predetermined size and shape, a press head movably mounted over said knives, a depressible feed table, means on said table for feeding veneer in stacks successively into position over said knives, means for actuating the press head to press the stacks into cutting relation with the knives and effect the cutting operation, and means associated with the press head and operatively engaged with the table and whereby the table is caused to move downwardly when the stack is depressed to thereby maintain that portion of the stack which is on the table in substantial alignment with the portion of the stack being severed by said knives.

13. In a machine for cutting strips from veneer, a bed frame, a plurality of knives supported by said frame, there being at least four knives, two of which are edge trimming knives and are spaced to cut adjacent the opposite edges of the veneer and an intermediate knife arranged with respect to said side knives to split the veneer operated on by said knives, a reciprocable press head mounted above said knives, a reciprocable feed table mounted adjacent the machine, a feed sprocket mounted on said table for feeding veneer in stacks successively to a position over said knives, means for driving said feed sprocket including a clutch member, means for guiding the stacks into proper cutting relation with respect to the knives, means for reciprocating the press head to press the stacks into cutting engagement with the knives, means associated with the press head adapted to engage the table and move the latter downwardly when the stack is depressed to thereby maintain that portion of the stack on the table in substantial alignment with that portion of the stack being operated upon by the knives, means for returning the table to normal position after each cutting operation, said clutch member being automatically disengaged and engaged through reciprocation of the feed table.

14. In a machine for cutting strips of veneer, a bed frame, a plurality of knives supported by said frame, said knives including a pair of laterally spaced side knives arranged to cut adjacent the opposite edges of the veneer, an intermediate knife arranged with respect to said side knives to split the veneer operated on by said latter knives, end trimming knives arranged laterally of the machine at substantially right angles to said side trimming and intermediate knives, a reciprocal press head mounted above said knives, a reciprocal feed table, means mounted on said table for feeding veneer in stacks successively to a position over said knives, means for guiding the stacks in proper cutting relation with respect to the knives, means for reciprocating the press head to press the stacks into cutting engagement with the knives, said press head being operatively connected with said feed table and whereby when the press head is reciprocated the table is in turn reciprocated to thereby maintain that portion of the stack on the table in substantial alignment with that portion of the stack being operated upon by the knives, and a clutch member operatively connected to said stack feeding means and arranged to disconnect the drive on the latter when the press head and table move downwardly to effect a cutting operation on the stack and to connect the drive when the table moves upwardly to stack-feeding position.

15. In a machine for cutting strips of veneer, a bed frame, veneer cutting means supported by said frame, a reciprocal press head mounted above said knives, a feed table, means operatively associated with said table for feeding veneer in stacks successively to a position over said cutting means, means for reciprocating said press head to press the stacks into cutting engagement with said cutting means, and means associated with said press head for preliminarily compressing said stack to render the latter more compact prior to being operated upon by said cutting means.

16. In a machine for cutting strips from veneer, a bed frame, knives supported by said frame and arranged to cut strips in predetermined size and shape, a reciprocable press head mounted above said knives, means for feeding veneer in stacks to a position over said knives, means for imparting reciprocation to said press head to press the stacks into cutting engagement with the knives to effect the cutting operation, a stack hold-down member carried by the press head, means normally urging said member upwardly in nonstack-engaging position, means whereby said member may be moved downwardly at the will of an operator to bring it in stack-engaging position below the stack-contacting surface of the press head, and means releasably latching said member in stack-engaging position.

17. In a machine for cutting strips from veneer, a bed frame, knives supported by said frame and arranged to cut strips in predetermined size and shape, a reciprocable press head mounted above said knives, means for feeding veneer in stacks to a position over said knives, means for imparting reciprocation to said press head to press the stacks into cutting engagement with the knives to effect the cutting operation, a stack hold-down member carried by the press head, means normally urging said member upwardly in nonstack-engaging position, means whereby said member may be moved downwardly at the will of an operator to bring it in stack-engaging position below the stack-contacting surface of the press head and means releasably latching said member in stack-engaging position including a trip member arranged to be engaged by a succeeding stack and release said latch means, permitting the said member to be pulled upwardly into nonstack-engaging position.

18. In a machine for cutting strips from veneer, a bed frame, knives supported by said frame and arranged to cut strips in predetermined size and shape, a reciprocable press head mounted above said knives, means for feeding veneer in stacks to a position over said knives, means for imparting reciprocation to said press head to press the stacks into cutting engagement with the knives to effect the cutting operation, a stack hold-down member carried by the press head, a spring normally urging said member upwardly in nonstack-engaging position, a lever operatively connected to said member whereby the latter may be pushed downwardly against the tension of said spring at the will of an operator to bring it in stack-engaging position below the stack-contacting surface of the press head, a latch coacting with said member and said press head and movable downwardly with said member whereby the latter is momentarily held in stack-engaging position, said latch including a trigger arranged to be engaged by a succeeding stack and trip said latch permitting said spring to pull the latch upwardly into nonstack-engaging position.

FRANK R. CAPPS.